Patented Oct. 17, 1950

2,525,783

UNITED STATES PATENT OFFICE 2,525,783

TREATMENT OF WELL-DRILLING FLUIDS

John R. Farrow, Huntington Park, Calif., assignor to National Lead Company, Los Angeles, Calif., a corporation of New Jersey No Drawing. Application April 6, 1946, Serial No. 660,294

9 Claims. (Cl. 252—8.5)

This invention relates to the treatment of well-drilling fluids, particularly as used in the rotary method of boring and controlling oil and gas wells.

A well-drilling fluid of the character described is generally of the aqueous type, that is, the external phase is water which may be laden with a clay or an amylaceous colloid, such as gelatinized starch, or both. The aqueous phase may be fresh water or salt water and, of course, is subject to entrainment of formation solids or soluble salts. The clay may be a suitable drilling clay or a concentrated colloidal clay such as bentonite. The starch base may be starches or flours of corn, potato, tapioca, rice, arrowroot, sago, arum, wheat, the by-products of flour, such as ship-stuff, shorts and middlings, etc., all of which are hereinafter referred to as "amylaceous colloids" or "starchy colloids." The starch is, of course, gelatinized in any suitable manner to provide an emulsoid colloid, an example of which is cold water laundry starch which gelatinizes in cold water. A thin-boiling starch prepared, for example, by mineral acid treatment, gelatinized by cooking with water is particularly useful for this purpose. Where starch is used with water it provides what may be called an "aqueous amylaceous-colloid-laden drilling fluid."

Where starch is employed in a well-drilling fluid the starch reduces the water-loss markedly as compared with cases where clays, including bentonite and fuller's earth are used. The starch is, however, subject to deterioration, apparently because of the presence of bacteria, yeasts, molds, fungi or enzymes derived therefrom which apparently split or break down the starch resulting in a condition of fermentation or souring of the drilling fluid. This deterioration of the starch may disadvantageously affect the desired characteristics of the fluid; for water loss increases rapidly as fermentation progresses and the fluid viscosity is disadvantageously affected and a condition analogous to "gas-cutting" may take place. While in salt water of comparatively high salt content (over 15%) deterioration of the starch and fermentation are often retarded, and while common salt may be added to fresh water drilling fluids, this deterioration and fermentation are not effectively inhibited, apart from the fact that the latter procedure requires large quantities of salt which is expensive, while the brine has a corrosive effect upon the equipment and has an effect of flocculating clay colloids. Another procedure to inhibit deterioration of the starch is to maintain the drilling fluid at a high pH., viz., about 12; however, this is also an expensive procedure.

One of the objects of this invention, therefore, is to provide a treatment of well-drilling fluids and more particularly of an aqueous amylaceous-colloid-laden well drilling fluid, whereby deterioration of the fluid may be effectively inhibited.

Another object is to provide an aqueous amylaceous-colloid-laden drilling fluid which is effectively inhibited against deterioration.

Another object is to provide a composition adapted for the treatment of well-drilling fluids.

Further objects will appear from the detailed description in which will be set forth a number of embodiments of this invention; it is to be understood, however, that this invention is susceptible of various embodiments within the scope of the appended claims.

Generally stated, and in accordance with an illustrative embodiment of this invention, the drilling fluid is treated with a formaldehyde and an inorganic boron compound. Formaldehyde itself, viz., HCHO, may be employed but this is ordinarily in a water solution or as a gas; it is, however, more convenient to employ a solid form of which paraformaldehyde is an example; another solid form is trioxymethylene. The boron compound may be one of the various inorganic compounds such as boric acid, sodium biborate or sodium tetraborate, such as borax. In some instances it may be desirable to add another alkali such as sodium carbonate or sodium bicarbonate. If formaldehyde itself is employed it may be introduced into the drilling fluid as a gas or as a solution in water; where solid formaldehyde is used it should be in granular form of about 30 mesh per lineal inch and the mesh of the solid boron compound should be about the same. Such treating agents may be introduced through a hopper and mixed with the drilling fluid in the same manner as solids are ordinarily added to drilling fluids. The treating agents may be introduced at the outlet of the well or into the pit in the usual manner in which compounds are added to a drilling fluid. It is preferable to pre-treat the drilling fluid with the treating agent so as to start with a fluid which has been more or less completely immunized.

The amounts of the formaldehyde and of the boron compound required to inhibit deterioration of the drilling fluid will depend upon the conditions encountered. Generally where the drilling fluid has a clay base and has added thereto a starch from, say 6 to 10 lbs. per barrel (42 gallons) of the fluid, it is advantageous to start with a strong initial treatment which in the case of the paraformaldehyde may be from 0.5 to 0.75 lb. per barrel of the fluid and from .2 to .8 lb. per barrel of borax. Thereafter the formaldehyde concentration may be maintained at .25 lb. per barrel during the course of drilling. It is not harmful to have an excess of formaldehyde in the drilling fluid, although that is not necessary. It has, however, been found that formaldehyde and the boron compound have a combined effect in that the amount of formaldehyde required will be less where used in connection with the boron compound than where the formaldehyde is used by itself; thus by the employment of from ½ to 2 lbs. of borax per barrel the formaldehyde may be reduced to .2 and even .1 per barrel. This is, of course, advantageous because the formaldehyde concentration required to inhibit deterioration of the fluid is less critical where a boron compound is employed in connection with the formaldeyhde.

A composition for the treatment of drilling fluids may be made up of the formaldehyde and the boron compound, thus a composition comprising 50% paraformaldehyde and 40% borax of a 30 mesh mixture is suitable. It is desirable, however, to incorporate a lumping inhibiter and a suitable one is magnesium carbonate. There may be also incorporated a suspending agent such as gelatinized starch or a fuller's earth of the Georgia-Florida type. A suitable mixture may be composed of 50% paraformaldehyde, 40% borax, 4% starch, 4% fuller's earth and 2% magnesium carbonate.

The starch may be added to the drilling fluid in any suitable manner, as by adding a solid pregelatinized starch through a hopper, or by cooking the raw starch without or with sodium hydroxide, and by adding the liquid to the drilling fluid. The amount of starch added is in accordance with requirements to secure the desired water loss; for instance, ten pounds per barrel of gelatinized starch employed by itself or in connection with a clay to obtain a water loss from 3 to 4 cc. (A. P. I.).[1] By the employment of agents as heretofore described, deterioration of the starchy drilling fluid may be effectively inhibited.

The agents described will effectively inhibit deterioration of the starchy colloids in fresh water and salt water drilling fluids. However, the agents may be employed where the drilling fluid is maintained at a high pH, viz., 12, and also in salt water fluids at a high salt concentration, viz., 15%. With the inhibiting agents it is, however, not necessary to maintain the fluid at a high pH or even at a high salt concentration, in fact, below a pH of about 10.5 the loss of formaldehyde is a minimum and the loss increases with an increase in pH. The pH of 7.0 to 10.5 is moreover desirable because at a lower pH some clays will flocculate and that is particularly true of bentonite. While borax will raise the pH, it is sometimes more convenient to adjust the pH with sodium carbonate to raise it and with sodium bicarbonate to lower it. Not only is the boron compound itself a fungicide but as pointed out above it has a combined effect when used with formaldehyde. Moreover, the boron compound acts as a buffer to maintain the pH.

Various methods may be employed for quantitatively determining the presence of formaldehyde in the drilling fluid. Methods of quantitatively analyzing for the concentration of formaldehydes are given in standard books, but especially in the book by J. F. Walker, "Formaldehyde," New York, 1944. A particular method which is readily adapted to rapid field use is the so-called sodium sulphite method, which consists of adding an excess of sodium sulphite solution to the filtrate from drilling mud, as obtained conveniently in the standard water loss determination, after having brought the filtrate to approximate neutrality; and then titrating the sodium hydroxide resulting from the interaction of the formaldehyde and sodium sulphite with a suitable indicator, such as orthocresolphthalein.

Having thus described the invention, what is claimed is:

1. A composition for the treatment of amylaceous-colloid-laden well-drilling fluids, consisting of as essential ingredients, substantially 50 parts of formaldehyde of a class consisting of paraformaldehyde and trioxymethylene and 40 parts of a water-soluble borate.

2. A composition for the treatment of amylaceous-colloid-laden well-drilling fluids, comprising as essential ingredients, a dry mixture of substantially 50 parts of a formaldehyde of a class consisting of paraformaldehyde and trioxymethylene, 40 parts of a water-soluble borate and 2 parts of magnesium carbonate.

3. A composition for the treatment of amylaceous-colloid-laden well-drilling fluids, comprising as essential ingredients, a dry mixture of substantially 50 parts of a formaldehyde of a class consisting of paraformaldehyde and trioxymethylene, 40 parts of a water-soluble borate, and 4 parts of an emulsoid colloid.

4. A composition for the treatment of amylaceous-colloid-laden well-drilling fluids, comprising as essential ingredients, a dry mixture of substantially 50 parts of a formaldehyde of a class consisting of paraformaldehyde and trioxymethylene, 40 parts of a water-soluble borate, 4 parts of an emulsoid colloid and 2 parts of magnesium carbonate.

5. An aqueous well-drilling fluid containing an amylaceous colloid and sufficient of a formaldehyde and of a water-soluble borate to maintain concentrations of at least 0.1 pounds per barrel of the formaldehyde and at least 0.2 pounds per barrel of the borate, in order to inhibit deterioration of the fluid by incipient degradation of the amylaceous colloid due to the presence of micro-biological or enzymatical constituents in the drilling fluid.

6. In the art of drilling wells by the employment of an aqueous well-drilling fluid, the process comprising, treating an aqueous amylaceous-colloid-laden drilling fluid, during the course of drilling, with sufficient of a formaldehyde and of a water-soluble borate to maintain concentrations of at least 0.1 pounds per barrel of the formaldehyde and at least 0.2 pounds per barrel of the borate, in order to inhibit deterioration of the fluid by incipient degradation of the amylaceous colloid due to the presence of micro-biological or enzymatical constituents in the drilling fluid.

7. In the art of drilling wells by the employment of an aqueous well-drilling fluid maintained at a pH of about 12, the process comprising, treating an aqueous amylaceous-colloid-laden drilling fluid, during the course of drilling, with sufficient of a formaldehyde and of a water-

[1] Viz.: The water loss in 30 minutes as determined in accordance with the American Petroleum Institute Standard Field Procedure for Testing Drilling Fluids. See also Drilling Mud of May 1940, pages 4, etc., describing the procedure.

soluble borate to maintain concentrations of at least 0.1 pounds per barrel of the formaldehyde and at least 0.2 pounds per barrel of the borate, in order to inhibit deterioration of the fluid by incipient degradation of the amylaceous colloid due to the presence of microbiological or enzymatical constituents in the drilling fluid.

8. In the art of drilling wells by the employment of an aqueous well-drilling fluid having a salt concentration of about 15%, the process comprising, treating an aqueous amylaceous-colloid-laden drilling fluid, during the course of drilling, with sufficient of a formaldehyde and of a water-soluble borate to maintain concentrations of at least 0.1 pounds per barrel of the formaldehyde and at least 0.2 pounds per barrel of the borate, in order to inhibit deterioration of the fluid by incipient degradation of the amylaceous colloid due to the presence of microbiological or enzymatical constituents in the drilling fluid.

9. In the art of drilling wells by the employment of an aqueous amylaceous-colloid-laden drilling fluid subject to incipient degradation of the amylaceous colloid due to the presence of microbiological or enzymatical constituents in the drilling fluid, the process comprising, treating such a fluid, during the course of drilling, with sufficient of a formaldehyde and of a water-soluble borate to maintain a concentration of from 0.1 to 0.2 pounds of formaldehyde and from 0.2 to 0.8 pounds per barrel of a water-soluble borate.

JOHN R. FARROW.

REFERENCES CITED

The following references are of record in the file of this patent:

UNITED STATES PATENTS

| Number | Name | Date |
| --- | --- | --- |
| 1,027,000 | Reuter | May 21, 1912 |
| 1,143,114 | Fuller | June 15, 1915 |
| 2,091,935 | Remy et al. | Aug. 31, 1937 |
| 2,207,737 | Hooft et al. | July 16, 1940 |

OTHER REFERENCES

Chaney et al.: A Review of Recent Advances in Drilling Mud Control, article in The Oil Weekly, Nov. 23, 1942, pages 25, 26, 28, 32, 34, 36, 38, 40, and 42 (page 38 most pertinent).